United States Patent [19]

Suzuki et al.

[11] Patent Number: 4,722,010

[45] Date of Patent: Jan. 26, 1988

[54] READ CIRCUIT FOR FLOPPY DISK DRIVE

[75] Inventors: Hiroshi Suzuki; Shouji Nakajima, both of Tokyo, Japan

[73] Assignee: Kabushiki Kaisha Toshiba, Kawasaki, Japan

[21] Appl. No.: 856,174

[22] Filed: Apr. 28, 1986

[30] Foreign Application Priority Data

Apr. 30, 1985 [JP]  Japan .................... 60-93246
Jun. 28, 1985 [JP]  Japan .................... 60-142154

[51] Int. Cl.⁴ .................... G11B 5/09; G11B 15/14
[52] U.S. Cl. .................... 360/46; 360/65
[58] Field of Search .................... 360/46, 51, 67, 65

[56] References Cited

U.S. PATENT DOCUMENTS

4,244,008  1/1981  Holt .................... 360/45
4,564,869  1/1986  Baumeister .................... 360/46

Primary Examiner—Vincent P. Canney
Attorney, Agent, or Firm—Finnegan, Henderson, Farabow, Garrett & Dunner

[57] ABSTRACT

In a read circuit for an FDD, a differentiator is constituted by a pair of current control transistors connected differentially, and a series circuit of a capacitor, an inductor, and first and second resistors connected between the transistors. A switch is connected across one of the resistors. When a track counter detects an inner track, it supplies an active signal to the switch. The switch is closed to short-circuit the resistor, thereby decreasing the damping value of the differentiator.

4 Claims, 15 Drawing Figures

READ CIRCUIT FOR FLOPPY DISK DRIVE

BACKGROUND OF THE INVENTION

The present invention relates to a read circuit for a floppy disk drive (to be referred to as an FDD hereinafter).

FDDs are commonly used as external storage units for data processors such as computers and wordprocessors.

A conventional FDD causes a magnetic head to read a magnetic inversion pattern from a disk and causes a predetermined signal processor to digitize the read data and perform subsequent processing.

Figure 1:
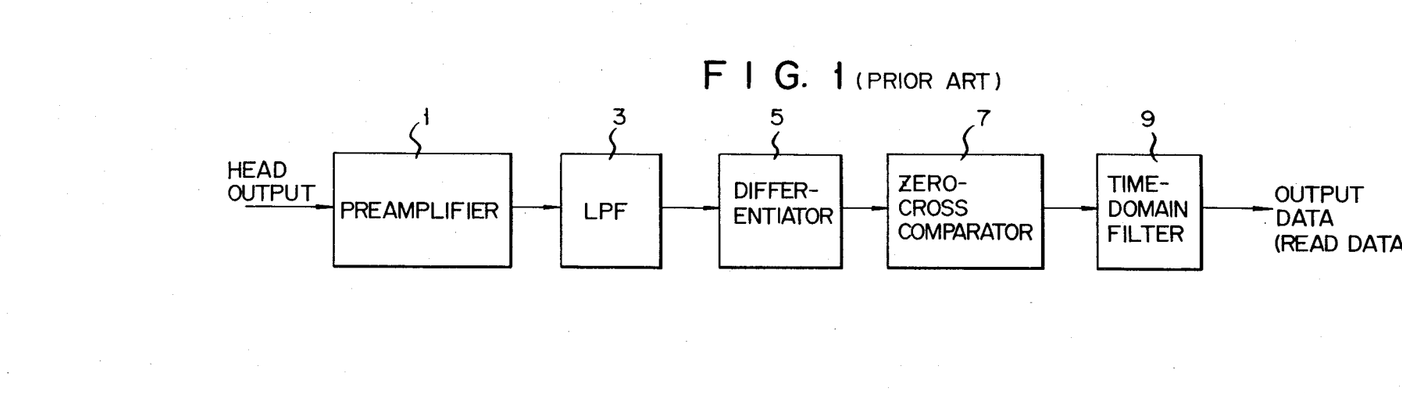
FIG. 1 is a block diagram showing the overall arrangement of a conventional read circuit for an FDD.

FIG. 1 shows a conventional signal processor. In the signal processor, an output signal from a magnetic head is amplified by preamplifier 1. The high-frequency noise component of an output signal from preamplifier 1 is then eliminated by low-pass filter (LPF) 3. The output waveform of the signal from LPF 3 is differentiated by differentiator 5. The zero-crossing points of the output signal from differentiator 5 are detected by zero-cross comparator 7, and digitization is performed. Noise is removed from the output signal of comparator 7 by time-domain filter 9.

Figure 2:
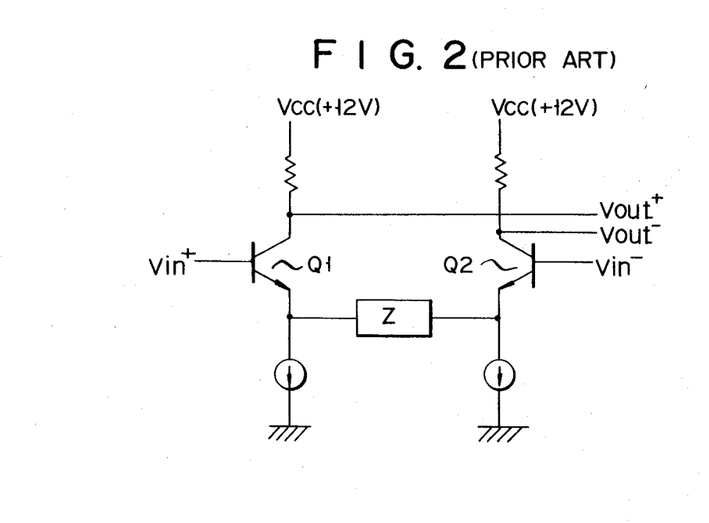
FIG. 2 is a circuit diagram showing the structure of a differentiator used in the conventional read circuit for an FDD.

FIG. 2 is a circuit diagram showing a detailed arrangement of differentiator 5 in the signal processor of FIG. 1. In differentiator 5, the output signal from the magnetic head is supplied to the bases of transistors Q1 and Q2, which are differentially connected. Differentiated waveforms are extracted from the collectors of transistors Q1 and Q2. Filter Z (hereinafter called a "differential filter"), for determining differential characteristics, is connected between the emitters of transistors Q1 and Q2.

Figure 3A:
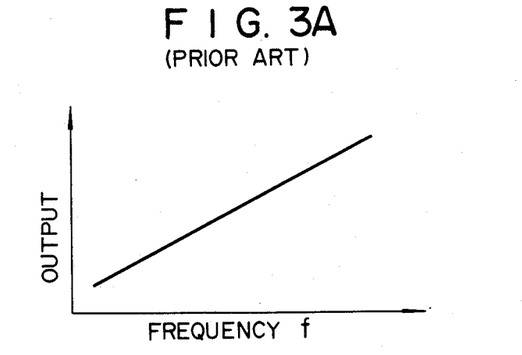
FIGS. 3A through 3C are graphs showing the frequency characteristics of differential filters constituted by various different elements.
Figure 3B:
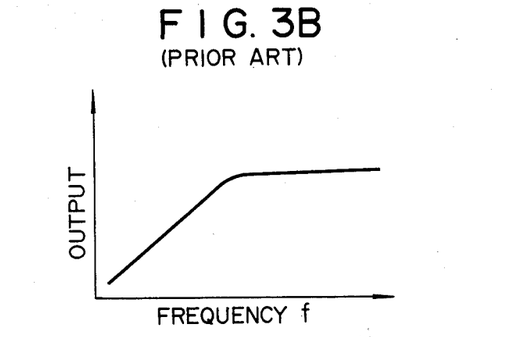
Figure 3C:
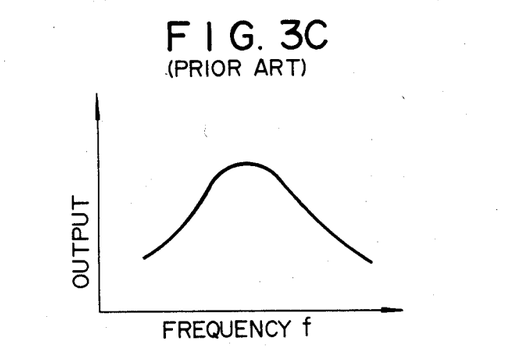

FIGS. 3A through 3C show the frequency characteristics of filter Z when it is constituted of (i) only a capacitor, (ii) a series circuit of a capacitor and a resistor, and (iii) a series circuit of a capacitor, a resistor and a coil. Case (i) shows good differential characteristics but suffers from amplified high-frequency noise. Case (ii) offers increase in suppressed highfrequency noise. Case (iii) provides a decrease in high-frequency noise.

In the characteristics of case (iii), resonance frequency f0 and damping value $\eta$ are given:

$$f0 = 1/\sqrt{LC} \qquad (1)$$

$$\eta = R/2 \cdot \sqrt{C/L} \qquad (2)$$

In the conventional FDD, the values of coil L, capacitor C and resistor R, constituting the differential filter for obtaining the characteristics in case (iii), are constant. Frequency f0 and damping constant $\eta$ of the differentiator are constant at the inner and outer sides of the disk.

In practice, however, the waveform of a signal read from the inner side of a disk differs greatly from that read from the outer side thereof.

Figure 4A:
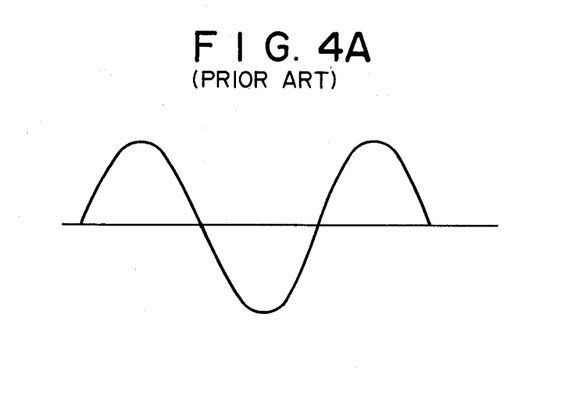
FIGS. 4A and 4B are charts showing the waveforms of signals read from the inner and outer sides of a disk, respectively.
Figure 4B:
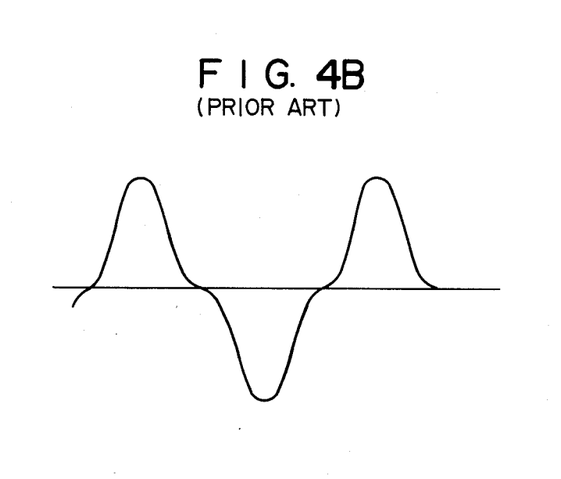

FIGS. 4A and 4B show raw signals read from the inner and outer sides of a disk, respectively. As is apparent from FIGS. 4A and 4B, the waveform of the signal read from the outer side of the disk includes a larger number of harmonic components (especially the third harmonic component) than that of the signal read from the inner side of the disk.

Figure 5:
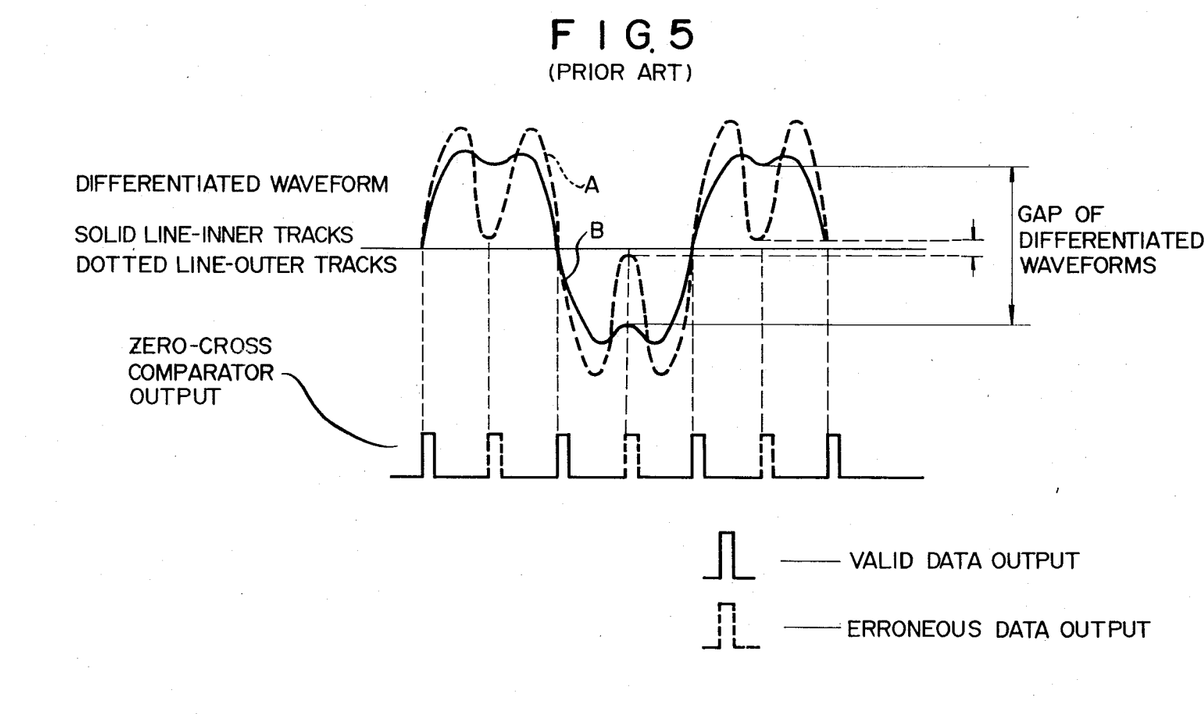
FIG. 5 is a chart showing waveforms of signals read from the inner and outer sides of a disk and passed through the conventional differentiator.

FIG. 5 shows the differentiated waveforms of signals read from the inner and outer sides of a disk and passed through the conventional differentiator consisting of coil L, capacitor C and resistor R, the values of which are all fixed. In FIG. 5, the solid line represents the signal read from the inner side of the disk, and the dotted line represents the signal read from the outer side of the disk. As is apparent from FIG. 5, the gap of the differentiated waveform of signal A, read from the outer side of the disk, is smaller than that of the gap of the differentiated waveform of signal B, read from the inner side of the disk. When the gap of the differentiated waveform is decreased and noise is superposed thereon, pseudo zero-crossing points are generated. Comparator 7 then generates false data pulses, thus causing read errors.

In conventional FDDs, this problem is resolved by decreasing cut-off frequency fc of the LPF at the outer side of the disk (this technique is called a switch filter scheme), or by increasing write current Iw at the outer side of the disk.

These techniques are based on the fact that the output, resolution and read margin of data from the outer side of the disk are higher and larger than for data from the inner side of the disk. These techniques purposely degrade the resolution of the signal read from the outer side of the disk to decrease the third harmonic component thereof. Even if the read margin at the outer side of the disk is slightly decreased, performance is not substantially degraded.

The resolution and the read margin will now be described.

Figure 6:
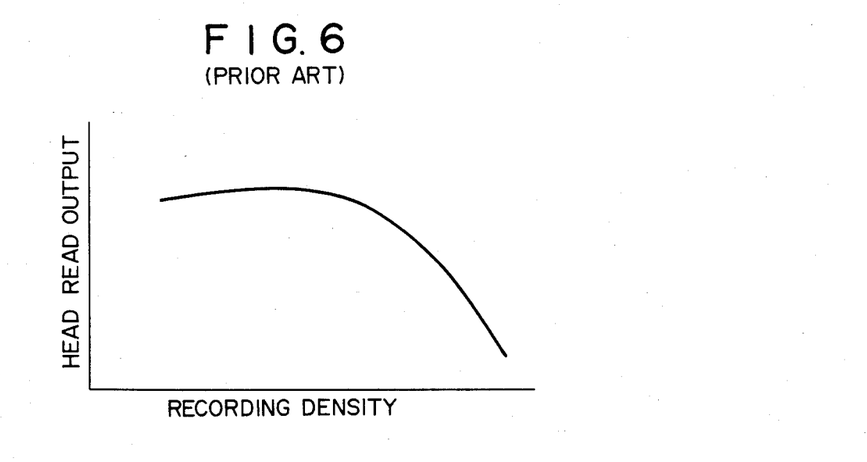
FIG. 6 is a graph for explaining the resolution of the read circuit for the FDD in accordance with the relationship between the recording density and the head readout.

FIG. 6 is a graph showing the frequency characteristics which the magnetic head and the disk exhibit when data is read by the magnetic head from the disk. As is apparent from FIG. 6, when the density of data recorded on the disk is increased, the signal level is lowered. In a conventional FDD, the velocities of the inner and outer sides of the disk and the data transfer rates thereof are constant. The recording density at the inner side of the disk is, therefore, inevitably higher than at the outer side.

The signal level of the magnetic head is lower at the outer side of the disk than at the inner side. For this reason, the signal read from the inner side of the disk has lower resolution than the signal read from the outer side. As resolution decreases, peak shifting increases due to waveform interference.

The read margin is called "noise margin", and can be considered as the degree of occurrence of read errors with respect to variations of data pulses due to peak shifting by waveform interference, noise, and rotational variations of the motor.

Figure 7:
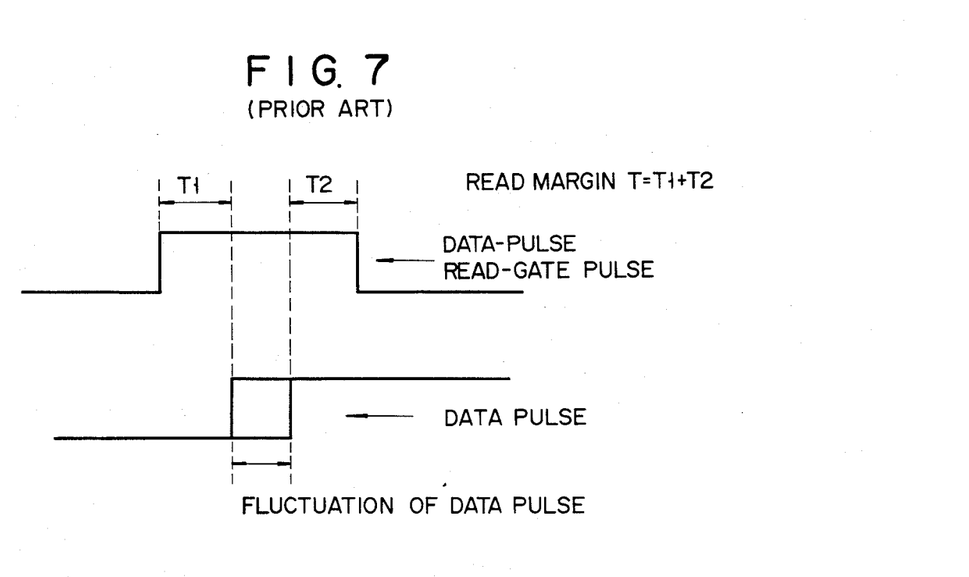
FIG. 7 is a chart for explaining the read margin of the read circuit for the FDD.

As shown in FIG. 7, assume that the widths of the read gate pulses in data pulses are gradually decreased to find a limit beyond which read errors do not occur. The limit is raised when margin T is increased, thereby improving the performance of the read circuit.

According to the switch filter scheme in conventional FDDs, however, the LPF filter constant is changed. Hence, a large number of components, especially resistors and capacitors, are required, resulting in a complex arrangement.

In the conventional scheme for increasing the write current at the outer side of the disk, the write current must be large to obtain a sufficient effect.

Still another conventional technique to solve the above problems is disclosed in U.S. Pat. No. 4,244,008.

U.S. Pat. No. 4,244,008 describes a read compensation circuit in a magnetic recording apparatus. According to this technique, the frequency characteristics of LPF 3 and the damping constant of differentiator 5 are changed. Harmonic components are increased to emphasize the waveform of the signal portion. As shown in FIG. 1 (prior art, or the U.S. patent), coils (L) 54a and 54b are selectively operated to change the L value, thereby changing the damping constant. However, when the coil value changes, the peak deviates from its normal position.

Recent FDDs use high-density recording media to increase the memory capacity. In these FDDs, a read circuit must read recorded data not only from a high-density magnetic recording medium but also from a low-density magnetic recording medium, assuming the two media are of the same shape. The rate of transferring data from the high-density magnetic recording medium is different from that of the low-density magnetic recording medium. There is a difference between the frequency bands of the signals from the two media. If the magnetic recording medium spins at a constant speed, and its recording density is doubled, the data transfer rate and, hence, the frequency bandwidth of the read signal are also doubled.

In this FDD, differentiator 3, provided in the read circuit, is adjusted such that differential filter characteristics correspond to high-density recording, providing a broadened signal frequency band.

When, in a read circuit with a differential filter arranged as described above, data is read from the low-density magnetic recording medium, high-frequency noise in the read signal is emphasized, thus decreasing the S/N ratio and read margin of the signal. Since a high-density recording head has a narrow read gap, resolution increases excessively when data is read from a low-density magnetic recording medium. The harmonic component also increases in the differentiated waveform of the read signal. As a result, error pulses are often mixed in with the read data pulses.

To solve the above problem, still another scheme has been proposed in which the cut-off frequency of the LPF is switched. However, a multi-stage filter arrangement is required, resulting in a complex circuit and a large number of components.

SUMMARY OF THE INVENTION

It is an object of the present invention to provide a read circuit designed for use in an FDD wherein frequency characteristics are switched during operations for reading out data from the inner and outer sides of a disk, and comprising a small number of components.

It is another object of the present invention to provide a simple read circuit for an FDD, wherein a differentiator whose differential filter characteristics vary according to the frequency band of a signal read from a magnetic head, is used to read data properly from magnetic recording media of different recording densities.

In order to achieve the above objects, there is provided a read circuit for a floppy disk drive, which receives an analog signal read by a magnetic head from a disk on which data is written such that a recording density of inner tracks is higher than that of outer tracks, and which outputs pulse data, comprising:

inner/outer track detecting means for detecting whether or not the magnetic head has accessed an inner or outer track of the disk;

a low-pass filter for eliminating a high-frequency component of the analog signal;

a differentiator having a pair of current control elements connected differentially, and a series circuit of a capacitor, an inductor and first and second resistors connected in series between the pair of current control elements, the differentiator being arranged to differentiate the analog signal from the low-pass filter;

resistor short-circuiting means for short-circuiting both terminals of one of the first and second resistors so as to decrease a damping value of the differentiator when a signal supplied from the inner/outer track detecting means is an active signal representing the inner track; and a zero-cross comparator for generating a pulse synchronized with the zero-crossing of a differentiated analog signal from the differentiator.

BRIEF DESCRIPTION OF THE DRAWINGS

Other objects and features of the present invention will be apparent from the following description taken in connection with the accompanying drawings, in which.

DETAILED DESCRIPTION OF THE PREFERRED EMBODIMENTS

Figure 8:
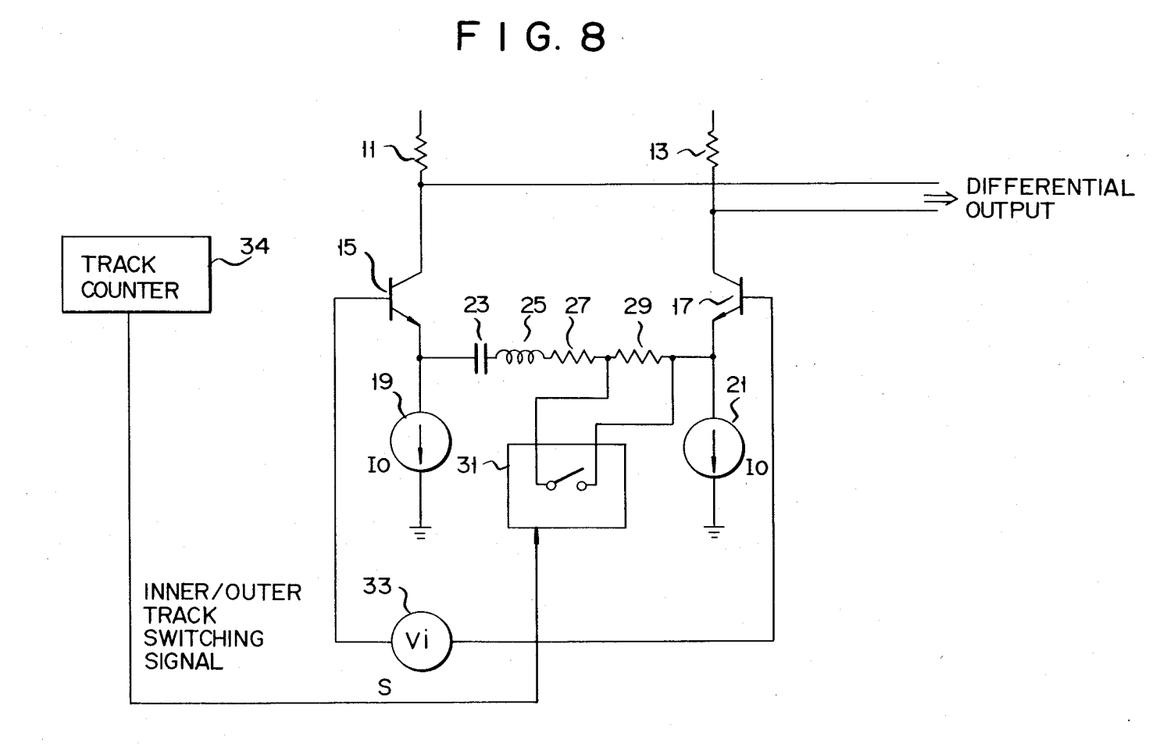
FIG. 8 is a circuit diagram showing an arrangement of a differentiator in a read circuit for an FDD according to an embodiment of the present invention.

FIG. 8 is a circuit diagram showing an arrangement according to an embodiment of the present invention.

The FDD read circuit of this embodiment is similar to the conventional FDD read circuit shown in FIG. 1, but uses differentiator 5 slightly different from that shown in FIG. 1. The differentiator elements identical with those of the differentiator shown in FIG. 1 will not be described in detail.

The differentiator shown in FIG. 8 has load resistors 11 and 13 for extracting signals from a magnetic head, transistors 15 and 17 connected differentially, and constant current circuits 19 and 21 for supplying constant currents in the collector-emitter paths of transistors 15 and 17. The differentiator also has a differential filter consisting of capacitor 23, inductor 25 and resistors 27 and 29 connected in series with each other, analog switch 31 for performing ON/OFF operations in response to the level of switching signal (the same signal as switch filter signal SFL) S for switching between the inner and outer tracks of the disk and for short-circuiting both ends of resistor 29 in the inner track read mode, and input signal source 33, which is output from the magnetic head. Switch 31 also receives an inner/outer track switching signal from track counter 34. When the head accesses an outer track, track counter 34 supplies to switch 31 a signal of a level representing an outer track. However, when the head accesses an inner track, track counter 34 supplies to switch 31 a signal of a level representing an inner track.

In the differentiator with the arrangement described above, when the level of signal S represents an inner track, switch 31 is turned on. As a result, resistor 29 is short-circuited, and the differential filter is constituted only by capacitor 23, inductor 25 and resistor 27.

However, when the level of signal S represents an outer track, switch 31 is turned off, and the differential filter is constituted by capacitor 23, inductor 25, and resistors 27 and 29. The value of resistance R during outer track access is larger than during inner track access, thus increasing damping value $\eta$.

When damping value n of the differentiator is increased upon outer track access, the third harmonic component of the read signal decreases, and the gap of the differentiated waveform in FIG. 5 increases. Even if noise is superposed on this waveform, pseudo zero-cross points do not appear. This prevents zero-cross point detection errors by the zero-cross comparator.

In this embodiment, since the damping value of the differentiator increases upon outer track access, the resolution is degraded correspondingly, and peak shifting by waveform interference is also increased. As a result, the S/N ratio is slightly reduced. However, during outer track access, sufficient resolution and peak shifting margins are provided, and such a decrease in resolution and an increase in peak shifting do not present any problem.

Figure 9:
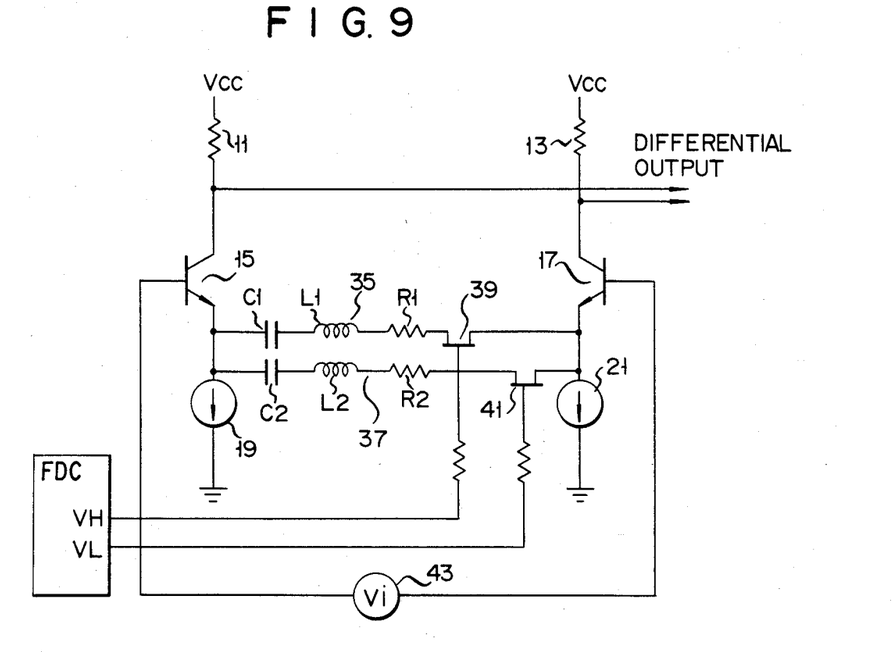
FIG. 9 is a circuit diagram showing another arrangement of the differentiator in the read circuit.

FIG. 9 is a circuit diagram of a differential differentiator in a read circuit according to another embodiment of the present invention. As shown in FIG. 9, this differentiator includes load resistors 11 and 13 for extracting amplified outputs, amplifying transistors 15 and 17, low current source circuits 19 and 21 for supplying constant currents, first and second differential filters 35 and 37, and switch circuits 39 and 41 comprising MOS transistors.

Inductor L1, capacitor C1 and resistor R1 constitute filter 35, which determines optimal differential characteristics when the periodic band of the read signal is relatively broad. Inductor L2, capacitor C2, and resistor R2 constitute filter 37, which determines optimal differential characteristics when the periodic band of the signal is relatively narrow. Circuit 39 is turned on in response to a floppy disk controller (FDC) with a circuit for detecting a recording density when a relatively high-density magnetic recording medium is read-accessed. Switch 41 is turned on in response to control signal VL from the FDC when a relatively low-density magnetic recording medium is read-accessed. Input signal source 43 outputs a signal for driving transistors 15 and 17.

Figure 10:
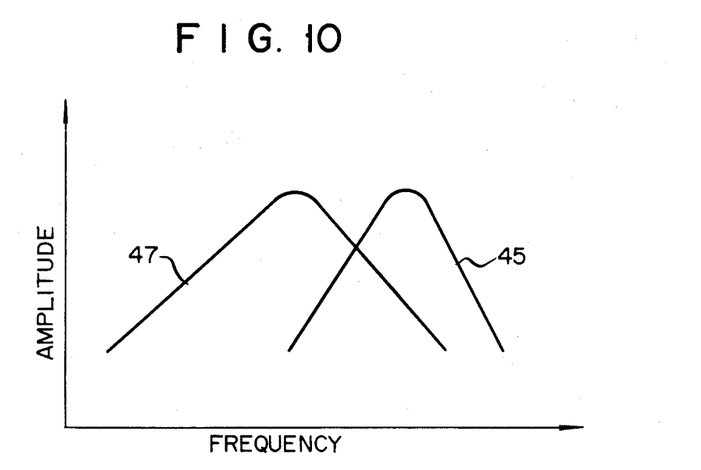
FIG. 10 is a graph showing frequency characteristics of the differentiator in FIG. 9.
Figure 11:
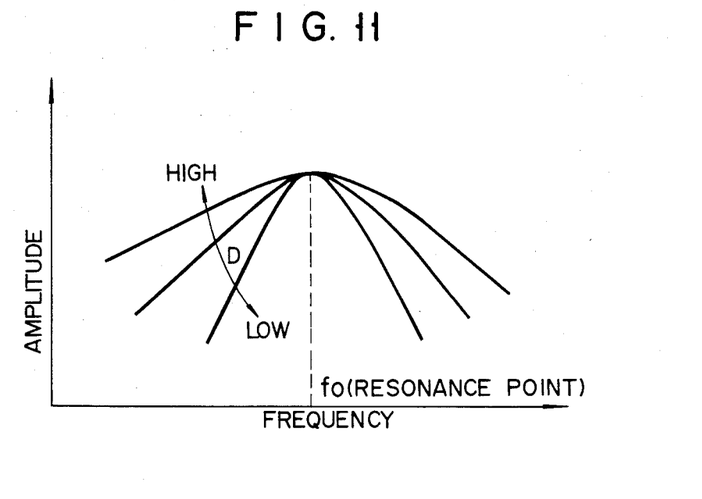
FIG. 11 is a graph showing amplitude characteristics of the differentiator of FIG. 9.

The operation of the second embodiment will be described below. In the second embodiment, high- and low-density magnetic recording media are used. When a high-density magnetic recording medium is set in the FDD and read-accessed, the FDC generates signal VH. More particularly, a host computer (not shown) sets a low-density read mode (i.e., signal VL is held active and transmitted through the FDC). When data is read and a read error occurs, the host computer sets a high-density mode (i.e., signal VH is held active). Alternatively, a hole can be formed in a magnetic recording medium, and the FDD can detect the hole to determine if the medium is of high density (VH signal is active) or low density (VL signal is active). When signal VH is active, circuit 39 in FIG. 9 is turned on, and the differential characteristics of the differentiator in the read circuit are determined by the filter characteristics of filter 35. In this case, as shown in FIG. 10, the differentiator has frequency characteristic curve 45. As shown in FIG. 11, the differential filter of an LCR series circuit has inverted U-shaped amplitude characteristics. The amplitude characteristics are changed by damping value $\eta$ given by equation (2).

When a high-density magnetic recording medium is set in the FDD, the frequency band of the read signal from the magnetic head is broad. Since the differentiator filter is constituted by filter 35, an optimal differentiated signal corresponding to the read signal of a broad frequency band is output from the differentiator. Read data pulses corresponding to the recording data of the magnetic recording medium can be generated by comparator 7 and filter 9 of FIG. 1 in accordance with the differentiated signal.

When a low-density magnetic recording medium is set in the FDD and read access is started, the FDC generates active signal VL. Circuit 41 of FIG. 9 is turned on, and the differential characteristics of the differentiator of the read circuit are determined by the filter characteristics of filter 37. In this case, the differentiator has frequency characteristic curve 47 shown in FIG. 10. The frequency band of the signal read by the magnetic head in this case is broad. The filter of the differentiator is constituted by filter 37 as described above, so the optimal differentiated signal corresponding to the read signal of the narrow frequency band is output from the differentiator.

If a read signal of narrow frequency band from the magnetic head is differentiated by the differentiator comprising high-density filter 35, high-frequency noise is emphasized, thus decreasing the S/N ratio and hence the read margin. Therefore the read signal of narrow frequency band is differentiated by the differentiator comprising low-density filter 37 to increase the read margin.

The high-density recording magnetic head has a short read gap. When this head reads data from a low-density magnetic recording medium, the read resolution is increased excessively. In this state, the harmonic components are increased, the gap of the differentiated waveform in FIG. 5 is decreased with respect to the read signal waveform in FIG. 4B, and the number of error pulses is increased due to superposition of noise on the read data. The read resolution is determined by the two ratios of read output to maximum and minimum write frequencies. In the second embodiment, since the differentiator is constituted by low-density filter 37 as described above, an optimal differentiated signal can be obtained, and the number of error pulses can be decreased.

Figure 12:
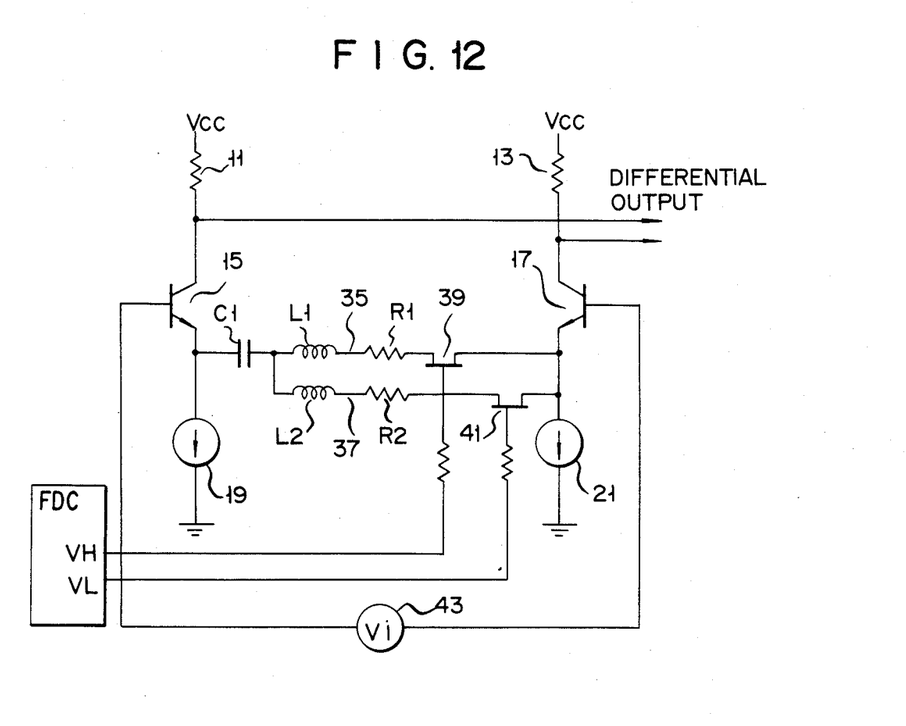
FIG. 12 is a circuit diagram showing still another arrangement of the differentiator in the read circuit for the FDD according to the present invention.

FIG. 12 is a circuit diagram of a differentiator according to still another embodiment of the present invention. In this differentiator, first and second differential filters 35 and 37 commonly use capacitor C1. In this case, the resonance point, damping, and gain determine the filter characteristics. Only the gain is fixed. By changing the resonance point and damping, the characteristics of the differential filter can be changed to correspond to the frequency band of the read signal. This embodiment can obtain the same effect as the second embodiment of FIG. 9.

What is claimed is:

1. A read circuit for a floppy disk drive, for receiving an analog signal read by a magnetic head from a disk on which data is written such that a recording density of inner tracks is higher than that of outer tracks, and which outputs pulse data, comprising:
   inner/outer track detecting means for detecting if the magnetic head has accessed an inner or outer track of the disk;
   a low-pass filter for eliminating a high-frequency component of the analog signal;
   a differentiator having a pair of current control elements connected differentially, and a series circuit of a capacitor, an inductor and first and second resistors connected in series between said pair of current control elements, said differentiator being arranged to differentiate the analog signal from said low-pass filter;
   resistor short-circuiting means for short-circuiting both terminals of one of said first and second resistors so as to decrease a damping value of said differentiator when a signal supplied from said inner/outer track detecting means is an active signal representing the inner track; and
   a zero-cross comparator for generating a pulse synchronized with the zero-crossing of a differentiated analog signal from said differentiator.

2. A read circuit for a floppy disk drive, which causes a magnetic head to read data from magnetic recording media recorded in one of a plurality of different recording modes corresponding to different recording densities, differentiates a read signal from the magnetic head, and outputs read data pulses in accordance with a differentiated signal, comprising:
   a plurality of differential filter means having filter characteristics corresponding to frequency bands of the read signal which are determined by the recording mode of the magnetic recording media, respectively;
   means for selecting an optimal one of said plurality of differential filter means which corresponds to a given frequency band of the read signal in response to an external selection signal, the given frequency band being determined by a corresponding one of the recording modes of the magnetic recording media; and
   means for outputting as the differential signal a signal generated by said differential filter means and selected by said selecting means.

3. A circuit according to claim 2, wherein each of said plurality of filter means comprises a series circuit of a capacitor, an inductor, and a resistor.

4. A circuit according to claim 2, wherein each of said plurality of differential filter means comprises a common capacitor and a series circuit of an inductor and a resistor.

* * * * *

UNITED STATES PATENT AND TRADEMARK OFFICE
CERTIFICATE OF CORRECTION

PATENT NO. : 4,722,010

DATED : January 26, 1988

INVENTOR(S) : Hiroshi Suzuki et al.

It is certified that error appears in the above-identified patent and that said Letters Patent is hereby corrected as shown below:

Cover page, change ASSIGNEE from "Kabushiki Kaisha Toshiba, Kawasaki, Japan" to --Kabushiki Kaisha Toshiba, Kawasaki, Japan and Toshiba Computer Engineering Corporation, Tokyo, Japan--.

Signed and Sealed this

Thirtieth Day of August, 1988

Attest:

DONALD J. QUIGG

Attesting Officer

Commissioner of Patents and Trademarks